(12) United States Patent
Zhamu et al.

(10) Patent No.: US 9,385,397 B2
(45) Date of Patent: Jul. 5, 2016

(54) PRELITHIATED CURRENT COLLECTOR AND SECONDARY LITHIUM CELLS CONTAINING SAME

(75) Inventors: Aruna Zhamu, Centerville, OH (US); Yanbo Wang, Fairborn, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 316 days.

(21) Appl. No.: 13/199,058

(22) Filed: Aug. 19, 2011

(65) Prior Publication Data

US 2013/0045427 A1    Feb. 21, 2013

(51) Int. Cl.
*H01M 10/0525*    (2010.01)
*H01M 4/36*    (2006.01)
(Continued)

(52) U.S. Cl.
CPC ......... *H01M 10/0525* (2013.01); *B32B 15/013* (2013.01); *B82Y 30/00* (2013.01); *H01G 11/06* (2013.01); *H01G 11/50* (2013.01); *H01M 4/0459* (2013.01); *H01M 4/362* (2013.01); *H01M 4/366* (2013.01); *H01M 4/38* (2013.01); *H01M 4/386* (2013.01); *H01M 4/387* (2013.01); *H01M 4/44* (2013.01); *H01M 4/463* (2013.01); *H01M 4/485* (2013.01); *H01M 4/505* (2013.01); *H01M 4/525* (2013.01); *H01M 4/587* (2013.01); *H01M 4/5815* (2013.01); *H01M 4/66* (2013.01); *H01M 4/662* (2013.01); *H01M 4/666* (2013.01); *H01M 4/667* (2013.01); *H01M 12/04* (2013.01); *H01M 12/08* (2013.01); *B32B 2307/202* (2013.01); *B32B 2307/702* (2013.01); *B32B 2457/10* (2013.01); *Y02E 60/122* (2013.01); *Y02E 60/13* (2013.01); *Y02P 70/54* (2015.11); *Y10T 428/12569* (2015.01); *Y10T 428/12625* (2015.01); *Y10T 428/12736* (2015.01); *Y10T 428/12778* (2015.01); *Y10T 428/24322* (2015.01); *Y10T 428/24802* (2015.01); *Y10T 428/249967* (2015.04); *Y10T 428/265* (2015.01); *Y10T 428/30* (2015.01); *Y10T 428/31678* (2015.04)

(58) Field of Classification Search
CPC . H01M 4/0459; H01M 4/0461; H01M 4/362; H01M 4/364; H01M 10/0525; H01M 4/667
USPC .................................................. 429/222, 403
See application file for complete search history.

(56) References Cited

U.S. PATENT DOCUMENTS 3,551,184 A    12/1970    Dremann et al.
3,928,681 A    12/1975    Alaburda
(Continued)

*Primary Examiner* — Basia Ridley
*Assistant Examiner* — James Erwin

(57) ABSTRACT

The present invention provides a battery or supercapacitor current collector which is prelithiated. The prelithiated current collector comprises: (a) an electrically conductive substrate having two opposed primary surfaces, and (b) a mixture layer of carbon (and/or other stabilizing element, such as B, Al, Ga, In, C, Si, Ge, Sn, Pb, As, Sb, Bi, Te, or a combination thereof) and lithium or lithium alloy coated on at least one of the primary surfaces, wherein lithium element is present in an amount of 1% to 99% by weight of the mixture layer. This current collector serves as an effective and safe lithium source for a wide variety of electrochemical energy storage cells, including the rechargeable lithium cell (e.g. lithium-metal, lithium-ion, lithium-sulfur, lithium-air, lithium-graphene, lithium-carbon, and lithium-carbon nanotube cell) and the lithium ion based supercapacitor cell (e.g, symmetric ultracapacitor, asymmetric ultracapacitor, hybrid supercapacitor-battery, or lithium-ion capacitor).

38 Claims, 9 Drawing Sheets

(51) Int. Cl.

| | |
|---|---|
| *H01M 4/04* | (2006.01) |
| *H01M 4/38* | (2006.01) |
| *H01M 4/44* | (2006.01) |
| *H01M 4/46* | (2006.01) |
| *H01M 4/485* | (2010.01) |
| *H01M 4/505* | (2010.01) |
| *H01M 4/525* | (2010.01) |
| *H01M 4/58* | (2010.01) |
| *H01M 4/587* | (2010.01) |
| *H01M 4/66* | (2006.01) |
| *H01M 12/04* | (2006.01) |
| *H01M 12/08* | (2006.01) |
| *H01G 11/06* | (2013.01) |
| *H01G 11/50* | (2013.01) |
| *B82Y 30/00* | (2011.01) |
| *B32B 15/01* | (2006.01) |

(56) References Cited

U.S. PATENT DOCUMENTS

| | | | |
|---|---|---|---|
| 4,824,746 A | 4/1989 | Belanger et al. | |
| 4,935,317 A | 6/1990 | Fauteux et al. | |
| 4,980,250 A | 12/1990 | Takahashi et al. | |
| 5,169,446 A | 12/1992 | Koksbang et al. | |
| 5,436,093 A | 7/1995 | Huang et al. | |
| 5,601,951 A | 2/1997 | Johnson et al. | |
| 5,721,067 A | 2/1998 | Jacobs et al. | |
| 6,025,093 A | 2/2000 | Herr | |
| 6,335,115 B1 | 1/2002 | Meissner | |
| 6,706,447 B2 | 3/2004 | Gao et al. | |
| 7,276,314 B2 | 10/2007 | Gao et al. | |
| 2003/0039890 A1 | 2/2003 | Yun et al. | |
| 2005/0130043 A1* | 6/2005 | Gao et al. | 429/231.95 |
| 2010/0092869 A1* | 4/2010 | Kaneko et al. | 429/303 |
| 2010/0173198 A1* | 7/2010 | Zhamu et al. | 429/222 |

* cited by examiner (E) prior art

PRELITHIATED CURRENT COLLECTOR AND SECONDARY LITHIUM CELLS CONTAINING SAME

This application is based on the research results of a project sponsored by the US National Science Foundation SBIR-STTR Program.

FIELD OF THE INVENTION

The present invention provides an air-stable, prelithiated current collector for a secondary (rechargeable) battery or supercapacitor cell, and a secondary cell that contains this prelithiated current collector. The secondary cell can be a lithium cell including a lithium-ion or lithium-metal cell (e.g. lithium-sulfur, lithium-air, lithium-graphene, lithium-carbon, and lithium-carbon nanotube cell), or a lithium ion-based supercapacitor cell (including symmetric ultracapacitor, asymmetric ultracapacitor, hybrid supercapacitor-battery, and lithium-ion capacitor).

BACKGROUND

This patent application is directed at a current collector that works with an anode or a cathode of a lithium cell (lithium-ion cell, lithium-metal cell, lithium-ion supercapacitor) or any electrochemical cell that makes use of lithium as a charge storage vehicle. This application is not directed at the anode or the cathode itself.

When used in a lithium-ion cell or lithium-metal cell, this prelithiated current collector of the present invention provides additional (supplementary) or the primary source of lithium ions to be shuttled between an anode and a cathode, and extra lithium to compensate for the formation of solid-electrolyte interface (SEI) or other lithium-consuming mechanisms. The lithium-metal cell includes the conventional lithium-metal rechargeable cell, lithium-air cell (Li-Air), lithium-sulfur cell (Li—S), and the emerging lithium-graphene cell (Li-graphene, using graphene sheets as a cathode), lithium-carbon nanotube cell (Li—CNT, using CNTs as a cathode), and lithium-nano carbon cell (Li—C, using nano carbon fibers or other nano carbon materials as a cathode). Although not necessary, the anode and/or the cathode themselves can contain some lithium, or can be prelithiated prior to cell assembly.

When used in a supercapacitor (symmetric, asymmetric, hybrid, or lithium-ion capacitor), this prelithiated current collector of the present invention provides additional (supplementary) or the primary source of lithium ions needed to form electric double layers (EDL capacitance) and/or redox pairs (pseudo-capacitance) at the anode and the cathode, and/or the lithium ions to be shuttled between an anode and a cathode (e.g. to be inserted into a graphite or lithium titanate anode when a lithium-ion capacitor is recharged, and to be captured by surfaces of a carbon cathode when discharged). Although not necessary, the anode and/or the cathode themselves can contain some lithium, or can be prelithiated prior to cell assembly.

In the late 1980s and early 1990s, several safety incidents associated with earlier lithium-metal secondary batteries led to the abandonment of this class of high energy-density cells, paving the way for the emergence of lithium-ion secondary batteries. The pure lithium metal sheet or film (commonly used in the earlier lithium-metal cell) is replaced by carbonaceous materials as the negative electrode (anode) active material in the lithium-ion battery. The most commonly used carbonaceous anode material is graphite that is intercalated with lithium when the cell is charged. The resulting graphite intercalation compound may be expressed as $Li_xC_6$, where x is typically less than 1. In order to minimize the reduction in energy density due to this replacement, x in $Li_xC_6$ must be maximized and the irreversible capacity loss $Q_{ir}$ in the first charge cycle of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g. In real practice, the specific capacity of a graphite anode is typically much less than 355 mAh/g.

It may be noted at the outset that lithium is normally stored in the cathode (e.g. Li as part of $LiCoO_4$) when a lithium-ion battery cell is assembled. This is due to the notion that cathode active materials are relatively more stable and prelithiated anodes are normally not air stable (very sensitive to oxygen and moisture in the open air). After the cell is fabricated, either the manufacturer or the user (typically the manufacturer) has to conduct the first charge cycle, bringing lithium ions out of the cathode active material (e.g. $LiCoO_4$ particles), through the electrolyte, and into the anode active material (e.g. graphite particles). This important point will be further explained later.

In addition to carbon- or graphite-based anode materials, other inorganic materials that have been evaluated for potential anode applications include metal oxides, metal nitrides, metal sulfides, and a range of metals, metal alloys, and inter-metallic compounds that can accommodate lithium atoms/ions. In particular, lithium alloys having a composition formula of $Li_aA$ (A is a metal such as Al, and "a" satisfies 0<a<5) has been investigated as potential anode materials. This class of anode active materials has a higher theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). Transition metal oxides, such as $Co_3O_4$ and $Mn_3O_4$, are also high-capacity anode active materials. An anode active material is normally used in a powder form, which is mixed with conductive additives and bonded by a binder resin. The binder also serves to bond the mixture to a current collector. Alternatively, an anode active material (e.g. Si) may be coated as a thin film onto a current collector.

The positive electrode (cathode) active material in a lithium-ion battery is typically selected from a broad array of lithium-containing or lithium-intercalated oxides, such as lithium manganese dioxide, lithium manganese composite oxide, lithium nickel oxide, lithium cobalt oxide, lithium nickel cobalt oxide, lithium vanadium oxide, and lithium iron phosphate. The cathode active material may also be selected from chalcogen compounds, such as titanium disulfate or molybdenum disulfate. These prior art materials do not offer a high lithium insertion capacity. The practically achievable specific capacity of a cathode material has been, for the most cases, significantly less than 200 mAh/g. Since the cathode specific capacity is relatively low, there is a strong desire to make use of a cathode active material to its full capacity.

As a lithium-ion cell is charged and discharged, lithium is alternately stored in the cathode and in the anode, so that the total amount of cyclable charges corresponds to the amount of lithium shuttling back and forth between the two electrodes. As indicated above, when the cell is assembled, usually the cathode active material is made to store the amount of lithium needed for the subsequent cyclic operation. This selection of cathode, instead of anode, to pre-store the needed lithium is mainly due to the notion that cathode active materials, such as lithium cobalt oxide, are relatively stable in ambient air (e.g., against oxidation) compared to lithiated graphite. However, the notion that this amount of lithium (that determines the battery capacity) is totally supplied from the cathode, limits the choice of cathode active materials because the active materials must contain removable lithium (thereby precluding the use of other non-lithiated materials that can be of significantly higher capacity). Also, delithiated products of $LiCoO_2$ and $LiNiO_2$ formed during charging (e.g. $Li_xCoO_2$ and $Li_xNiO_2$ where $0.4 \leq x \leq 1.0$) and overcharging (i.e. $Li_xCoO_2$ and $Li_xNiO_2$ where $x<0.4$) are not stable. In particular, these delithiated products tend to react with the electrolyte and generate heat, which raises safety concerns. It is thus desirable to have a different way of supplying the needed lithium than using a cathode active material or a prelithiated graphite anode.

Further, when a lithium-ion cell is charged for the first time, lithium is extracted from the cathode and introduced into the anode. As a result, the anode potential is lowered significantly (toward the potential of metallic lithium), and the cathode potential is further increased (to become even more positive). These changes in potential may give rise to parasitic reactions on both electrodes, but more severely on the anode. For example, a decomposition product known as solid electrolyte interface (SEI) readily forms on the surfaces of carbon anodes, wherein the SEI layer comprises lithium and electrolyte components. These surface layers or covering layers are lithium-ion conductors which establish an ionic connection between the anode and the electrolyte and prevent the reactions from proceeding any further.

Formation of this SEI layer is therefore necessary. However, as the SEI layer is formed, a portion of the lithium introduced into the cells via the cathode is irreversibly bound and thus no longer participates in the cyclic operation. This means that, during the course of the first discharge, not as much lithium moves from the anode to the cathode as has previously been inserted into the anode during the first charging operation. This phenomenon is called irreversible capacity loss and is known to consume typically about 10% to 20% of the capacity of a lithium ion cell.

A further problem is that the formation of the SEI layer on the anode after the first charging operation may be incomplete and will continue to progress during the subsequent charging and discharge cycles. Even though this process becomes less pronounced with an increasing number of repeated charging and discharge cycles, it still causes continuous abstraction, from the system, of lithium which is no longer available for cyclic operation and thus for the capacity of the cell. Additionally, as indicated earlier, the formation of a solid-electrolyte interface layer consumes about 10% to 20% of the amount of lithium originally stored at the cathode, which is already low in capacity (typically <200 mAh/g). Clearly, it would be a significant advantage if the cells do not require the cathode to supply the required amount of lithium. It would be further advantageous if one could find an alternative way of safely and reliably supplying extra amounts of lithium to compensate for the initial and continued capacity loss.

One solution to this lithium supply issue being contemplated is to pre-store some (if not all) of the needed lithium in the anode. For instance, Takahashi, et al ["Secondary Battery," U.S. Pat. No. 4,980,250, Dec. 25, 1990], Huang, et al ["Method for Fabricating Carbon Lithium-Ion Electrode for Rechargeable Lithium Cell," U.S. Pat. No. 5,436,093, Jul. 25, 1995], and Jacobs, et al ["Rechargeable Lithium Battery Having Improved Reversible Capacity," U.S. Pat. No. 5,721,067 (Feb. 24, 1998)] disclosed methods by means of which lithium is introduced into the anode active material in order to minimize the irreversible capacity loss. However, prelithiated anode active materials, such as carbon or graphite, lead to electrodes which can be handled only under non-oxidizing and dry conditions, making practical production of lithium ion batteries difficult. Yun, et al [US 2003/0039890] prepared an electrode (anode) layer of graphite particles bonded by a resin binder (PVDF) and then deposited lithium on the surface of graphite particles of this anode, as opposed to inserting lithium into the bulk of graphite particles. Nevertheless, lithium deposited on the exterior surface of an anode active material is just like a discrete piece of lithium metal, which is not air-stable and must be handled in an oxygen-free and moisture-free environment.

Meissner ["Secondary Lithium-ion Cell with an Auxiliary Electrode," U.S. Pat. No. 6,335,115 (Jan. 1, 2002)] disclosed a secondary lithium-ion cell, which includes a carbon anode, a non-aqueous electrolyte, a cathode, and a lithium-containing auxiliary electrode disposed in the cell to compensate for the irreversible capacity loss. This auxiliary electrode is spatially separated from the electrolyte when the cell is positioned in a first orientation and contacts the electrolyte when the cell is oriented in a second position, for supplying additional lithium to the cell. Such an additional electrode makes the battery very complicated and difficult to make. Switching between two orientations is not a good strategy since it would complicate the handling of the battery and an average consumer would not pay attention to such a detail to ensure proper operation of such a battery.

The approach of using a separate, sacrificial electrode, in addition to an anode and a cathode in a cell, was also proposed earlier by Johnson, et al. ["Rechargeable Lithium Ion Cell," U.S. Pat. No. 5,601,951, (Feb. 11, 1997)] and by Herr ["Lithium Ion Cell," U.S. Pat. No. 6,025,093 (Feb. 15, 2000)]. Again, this additional electrode further complicates the manufacture and operation of a resulting battery. The assembling operation of a battery containing a highly reactive lithium metal or alloy electrode must be handled in an oxygen-free and moisture-free environment.

Gao, et al. ["Lithium Metal Dispersion in Secondary Battery Anode," U.S. Pat. No. 6,706,447, Mar. 16, 2004 and U.S. Pat. No. 7,276,314 (Oct. 2, 2007)] disclosed a secondary battery containing an anode that is formed of a host material (e.g. graphite) capable of absorbing and desorbing lithium in an electrochemical system and lithium metal dispersed in the host material. The lithium metal is a finely divided lithium powder having a mean particle size of less than about 20 microns. The host material may be selected from carbonaceous materials (e.g., graphite), Si, Sn, tin oxides, composite tin alloys, transition metal oxides, lithium metal nitrides and lithium metal oxides. The method of preparing such an anode includes the steps of providing a host material, dispersing lithium metal particles in the host material, and then forming the host material and the lithium metal particles dispersed therein into an anode. The lithium metal powder and the host material are mixed together with a non-aqueous liquid to produce a slurry and then applied to a current collector and dried to form the anode. The approach of Gao, et al has the following drawbacks:

(1) The anode is composed of an anode active material (e.g., graphite or Sn particles) and a discrete lithium metal phase (fine Li metal powder particles) forming a mixture of two types of particles. This implies that the anode still contains highly active lithium particles that are sensitive to oxygen and moisture and must be handled under very stringent conditions.

(2) Even when the lithium powder particles are surface protected (e.g. embraced by a layer of wax), this protective layer will react with electrolyte, significantly degrading the electrolyte performance or reducing the effective electrolyte amount. Further, there is a high tendency of breaking off this weak protective layer (exposing lithium to open air) during the electrode production procedure, thus significantly complicating the battery manufacturing operations.

(3) In a follow-on patent application, Gao, et al. ["Lithium metal dispersion in electrodes," US Patent Application Pub. No. 2005/0130043 (Jun. 16, 2005)] suggested methods of lithiating an electrode prior to combining electrodes and other components to form a battery. In all cases, the electrode is composed of a mixture of discrete lithium metal particles or wire screen and powder particles of a host material, the latter being partially litiated. As shown in FIG. 1 of Gao, et al [2005/0130043], the anode comprises discrete lithium metal particles and a host material. Both the discrete lithium metal particles and lithiated carbonaceous material (graphite) are unstable in an oxygen- or moisture-containing environment. Furthermore, Gao, et al. have not fairly suggested how other anode active materials than graphite can be prelithiated in a controlled manner (e.g., without inducing a lithium coating on the surface of active material particles). In fact, no example was given to illustrate if or how other important anode active materials can be successfully prelithiated prior to battery production. No battery testing or electrochemical performance evaluation data was given in any of Gao's patents or patent application to demonstrate the advantages of their electrodes.

Therefore, there exists an urgent need for a secondary lithium-ion battery that has one or more of the following features or advantages:

a) The battery does not contain a sacrificial electrode or an extra electrode in addition to an anode and a cathode in a cell;
b) The battery comprises an anode that does not contain an unstable lithium metal phase or lithium metal powder particles dispersed in the anode;
c) The battery contains no prelithiated anode active material that is not air stable and, hence, not conducive to battery fabrication in an ambient environment. Prelithiated carbonaceous anode materials (e.g., graphite, hard carbon, soft carbon, surface-modified graphite, chemically modified graphite, or meso-carbon micro-beads, MCMBs) are unstable in regular room air;
d) The battery comprises a convenient source of lithium (not disposed in an electrode active material) to compensate for the formation of SEI layers during charging, in addition to providing enough lithium to intercalate into a cathode active material during discharging.
e) The battery features a long and stable cycle life due to an adequate supply of lithium to compensate for potentially continued irreversible consumption of lithium.

The present invention addresses all of the aforementioned issues associated with lithium-ion batteries.

Furthermore, as indicated earlier, today's most favorite energy storage devices (lithium-ion batteries) actually evolved from rechargeable lithium-metal batteries using lithium (Li) metal as the anode and a Li intercalation compound as the cathode. Lithium metal is an ideal anode material due to its light weight (the lightest metal), high electronegativity (−3.04 V vs. the standard hydrogen electrode), and high theoretical capacity (3,860 mAh/g). This advantage of high capacity can be realized if the two major issues associated with the lithium metal anode can be resolved: (a) lithium metal instability in open air during cell fabrication and (b) dendrite formation during repeated discharges and charges. Dendrites are tree-like lithium structures that are formed during repeated charges and discharges, and often lead to internal shorting of a rechargeable lithium-metal cell (responsible for several lithium-metal cell failure-related incidents in late 1980s mentioned earlier). It is strongly desirable to avoid using a discrete layer of lithium metal (e.g. lithium foil) alone as an anode, or as a simple (unprotected) lithium coating on a copper current collector. The present invention also addresses this critically important safety issue.

In addition, a convenient and safe source of lithium is also essential to the operation of current and emerging high-energy or high-power lithium cells, such as the lithium-sulfur, lithium-air, lithium-graphene, lithium-carbon, lithium-carbon nanotube, symmetric supercapacitor, asymmetric ultracapacitor, hybrid supercapacitor-battery, or lithium-ion capacitor cell. The present invention also provides a surprisingly effective and safe solution to the lithium source problem in this wide variety of energy storage cells.

Thin lithium films are promising sources of lithium for the aforementioned applications. However, in addition to having the safety issue, very thin lithium foil is difficult and expensive to manufacture. Also, thin lithium foil, e.g., less than 20 microns thick, is too soft to have sufficient physical integrity for the production of cells and for strong connections with the required terminals. Lithium coated on a metal foil, such as copper, nickel, titanium, stainless steel, chrome plated steel and nickel plated steel, offers a good compromise between the desire for a very thin lithium layer and the requirement for sufficient physical integrity of the anode. But, the lithium coating layer remains sensitive to the oxygen, moisture, and nitrogen contents in open air.

Fauteux et al, [U.S. Pat. No. 4,935,317 (Jun. 19, 1990)] disclosed some typical composite cathode compositions and the utilization of lithium-coated metal foil as an anode. Many methods for coating lithium onto metal substrates are known in the art. For instance, Dremann et al. [U.S. Pat. No. 3,551,184 (Dec. 29, 1970)] proposed rubbing a heated metal substrate with a rod of lithium. Alaburda [U.S. Pat. No. 3,928,681 (Dec. 23, 1975)] disclosed Li coating of a metal substrate as it was conveyed through a lithium metal melt. Belanger et al. [U.S. Pat. No. 4,824,746 (Apr. 25, 1989)] disclosed a process of coating lithium or lithium alloy onto a metal substrate as the substrate is conveyed across a roller which is immersed in molten lithium or lithium alloy. A similar process is disclosed in U.S. Pat. No. 5,169,446 (Koksbang et al., Dec. 8, 1992). All these processes have to be conducted in a vacuum or protective atmosphere, but the coated substrate still has to be taken out of the coating equipment chamber and exposed to open air. No effective way of stabilizing the metal substrate-supported lithium coating film was disclosed in these studies.

Therefore, a need exists for an electrode structure that enables the electrochemical cell to operate with a high specific capacity, minimal irreversible capacity decay, and a long cycle life. In order to accomplish these goals, we have worked diligently and intensively on the development of new cell configuration, new electrode materials, and new current collectors. We have surprisingly found that a prelithiated current collector is a more versatile, more effective, and safer lithium source for all kinds of electrochemical cells, as opposed to using a prelithiated anode active material (not air stable), a free-standing lithium thin film (not air stable), or a simple lithium-coated metal substrate as an anode (not air stable).

In one preferred embodiment, this current collector is composed of a conductive substrate (e.g. Cu foil) coated with a layer of a mixture between carbon (as an example of a stabilizing agent) and lithium (or lithium alloy). By mixing lithium atoms with carbon (particularly amorphous carbon), we were able to form a mixture layer that is surprisingly air stable. Lithium atoms well dispersed in a disordered or amorphous carbon matrix, without forming lithium carbide, provides a stable source of lithium after a lithium cell is made. When the lithium content in the mixture layer exceeds approximately 80%, it is advantageous to deposit a thin layer of carbon to cover the mixture layer, completely eliminating the possibility of any air instability. Such a prelithiated current collector can be used in any cell that requires or needs a lithium source or an extra amount of lithium ions.

As compared to a prelithiated anode active material (e.g. prelithiated graphite), the prelithiated current collector is more advantageous in that, (a) the prelithiated current collector is more air stable, safer, and easier to handle; and (b) the prelithiated anode has a relatively limited lithium content (e.g. cannot exceed 355 mAh/g capacity) and, if portion of the stored lithium (out of this 355 mAh/g) is charged to enter a cathode active material, any parasitic or irreversible reaction occurring in the electrolyte or the cathode would serve to reduce the amount of lithium ions coming back to the anode during the subsequent recharge. Thus, the anode capacity would be lower than the initial capacity. If these irreversible reactions continue during subsequent charge/discharge cycles, the cell capacity will continue to drop. By contrast, the amount of lithium that can be pre-stored in the presently invented prelithiated current collector does not suffer from this limitation. The desired amount of lithium for the design capacity plus the anticipated need to compensate for the continued loss can be precisely pre-loaded into the current collector. This very subtle yet very significant advantage has never been recognized in any prior work.

SUMMARY OF THE INVENTION

The present invention provides a battery or supercapacitor current collector which is prelithiated. The prelithiated current collector comprises: (a) an electrically conductive substrate having two opposed primary surfaces, and (b) a mixture layer of carbon (or a stabilizing agent, such as those elements in columns 5, 6, 7, and 8 of the periodic table: B, Al, Ga, In, Si, Ge, Sn, Pb, As, Sb, Bi, and Te) and lithium (or lithium alloy) coated on at least one of the primary surfaces, wherein lithium element is present in an amount of 1% to 99% by weight of the mixture layer. The stabilizing agent can also be selected from a transition metal, or a combination of a transition metal with an element selected from columns 5, 6, 7, and 8 of the periodic table (e.g. B, Al, Ga, In, C, Si, Ge, Sn, Pb, As, Sb, Bi, and Te). This current collector serves as an effective and safe lithium source for a wide variety of electrochemical energy storage cells, including the rechargeable lithium-metal, lithium-ion, lithium-sulfur, lithium-air, lithium-graphene, lithium-carbon, lithium-carbon nanotube, symmetric supercapacitor, asymmetric ultracapacitor, hybrid supercapacitor-battery, or lithium-ion capacitor cell.

The prelithiated current collector may further comprise a carbon layer deposited on the mixture layer. Preferably, a mixture layer of lithium (or lithium alloy) and a stabilizing agent is coated on both primary surfaces and, further preferably, an additional discrete carbon layer is deposited on the mixture layer coated on at least one of the two primary surfaces. The mixture layer preferably has a thickness in the range of 0.1 nm and 25 μm, more preferably less than 1 μm, and can be less than 100 nm or even less than 10 nm.

The conductive substrate is preferably selected from a graphite layer, flexible graphite foil, foil of graphene sheets, foil of graphene oxide sheets, copper foil, nickel foil, stainless steel foil, nickel-coated stainless steel foil, copper-coated steel foil, titanium foil, chrome plated steel sheet, aluminum foil, carbon-coated aluminum foil, metal-coated polymer film, intrinsically conductive polymer film, conductive filler-polymer composite film, a porous nano-structured layer composed of graphene, graphene oxide, graphene fluoride, doped graphene, doped graphene oxide, carbon nano-fiber, carbon nano-tube, carbon black, activated carbon, disordered carbon, soft carbon, hard carbon, meso-phase carbon, nano carbon particle, and/or nano graphite particle, or a combination thereof. Actually, there is no particular limitation on the type of electrically conductive substrate, provided that the material can be made into a thin sheet, foil, or film with a thickness preferably thinner than 500 μm, further preferably thinner than 200 μm, and most preferably thinner than 100 μm.

The mixture layer of carbon (or other stabilizing agent) and lithium (or lithium alloy) can further comprise an element selected from an alkali metal, alkaline earth metal, transition metal, boron (B), aluminum (Al), gallium (Ga), indium (In), tin (Sn), silicon (Si), germanium (Ge), lead (Pb), selenium (Se), antimony (Sb), or bismuth (Bi). The stabilizing element can be selected from the elements in columns 5, 6, 7, and 8 of the periodic table (such as B, Al, Ga, In, Si, Ge, Sn, Pb, As, Sb, Bi, and Te) and transition metals, with or without the presence of carbon (C).

The mixture layer and/or the protective carbon layer may be a continuous-length layer. Alternatively, the mixture layer does not fully cover one primary surface, leaving an amount of exposed substrate surface free from the mixture of lithium (or lithium alloy) and the stabilizing agent.

The present invention also provides a lithium-ion battery containing a current collector defined above. Preferably, the lithium-ion battery contains an anode current collector as defined above, an anode active material in contact with the anode current collector, a separator and electrolyte in ionic contact with the anode active material, a cathode in contact with the electrolyte, and a cathode current collector (prelithiated or non-lithiated) in contact with the cathode. It is of fundamental significance to note that the anode or cathode in the battery is separate from, and in addition to, the prelithiated current collector. The prelithiated current collector itself is not an electrode (anode or cathode).

Alternatively, the lithium-ion battery may contain an anode current collector (prelithiated or non-lithiated), an anode active material in contact with the anode current collector, a separator and electrolyte in ionic contact with the anode active material, a cathode, and a prelithiated cathode current collector of the present invention.

Preferably, the anode active material is selected from the group consisting of (a) Carbon, meso-phase carbon, soft carbon, hard carbon, carbon black, activated carbon, natural graphite, artificial graphite, pyrolytic graphite, exfoliated graphite flakes, graphite worm, carbon nano-fiber, carbon nano-tube, graphene, graphene oxide, graphene fluoride, carbon fiber, graphite fiber, graphite whisker, and coke;

(b) Silicon (Si), germanium (Ge), tin (Sn), lead (Pb), antimony (Sb), bismuth (Bi), zinc (Zn), aluminum (Al), and cadmium (Cd);

(c) Alloys or intermetallic compounds of Si, Ge, Sn, Pb, Sb, Bi, Zn, Al, Ti, Fe, Mn, or Cd with other elements, wherein said alloys or compounds are stoichiometric or non-stoichiometric;

(d) Oxides, carbides, nitrides, sulfides, phosphides, selenides, and tellurides of Si, Ge, Sn, Pb, Sb, Bi, Zn, Al, Fe, Ti, Mn, Co, or Cd, and their mixtures or composites; and
(e) Combinations thereof.

The anode active material is preferably of nanocrystalline or amorphous structure in a thin film (coating) or fine particle form (including nano particle, nano-wire, nano-tube, nano-rod, nano-sheet, nano-belt, etc).

Alternatively, the lithium-ion cell may contain a prelithiated current collector at the anode and a non-lithiated or prelithiated current collector at the cathode plus other components described above (such as an anode, a separator, a cathode, and electrolyte).

With the presence of a prelithiated current collector, the lithium-ion battery does not have to make use of a lithiated cathode active material (e.g. lithium cobalt oxide or lithium ion phosphate), which tends to have a lower lithium storage capacity. The use of a prelithiated current collector makes it possible to utilize a cathode having a lithium-free cathode active material. The lithium-free cathode active material may be selected from sulfur, a chalcogen compound, $TiS_2$, $MoS_2$, $MnO_2$, $CoO_2$, $VO_2$, $V_2O_5$, $V_3O_8$, $V_4O_9$, $V_6O_{13}$, transition metal oxide, a non-lithiated intercalation compound, or a combination thereof.

The present invention also provides a lithium-metal battery containing a prelithiated current collector as defined above. This is preferably a rechargeable lithium-metal battery containing a prelithiated anode current collector, a porous anode, a separator and electrolyte in contact with the anode, a cathode in contact with the electrolyte, and a cathode current collector (prelithiated or non-lithiated) in contact with the cathode.

The present invention furthers provides a rechargeable lithium ion-enabling cell containing a prelithiated anode current collector, wherein the cell is selected from
a) A lithium-sulfur cell, comprising a nano-structured porous anode, a separator and electrolyte, a sulfur cathode, and a cathode current collector;
b) A lithium-air cell, comprising a nano-structured porous anode, a separator and electrolyte, and an air cathode;
c) A lithium-graphene cell, comprising a nano-structured porous anode, a separator and electrolyte, a cathode comprising nano sheets of graphene, graphene oxide, graphene fluoride, doped graphene, and/or doped graphene oxide;
d) A lithium-carbon cell, comprising a nano-structured porous anode, a separator and electrolyte, a cathode comprising carbon nano-fiber, carbon nano-tube, carbon black, activated carbon, disordered carbon, soft carbon, hard carbon, meso-phase carbon, nano carbon particle, and/or nano graphite particle; or
e) A symmetric or asymmetric ultracapacitor cell, hybrid supercapacitor-battery cell, or lithium-ion capacitor cell, comprising an anode, a separator and electrolyte, and a cathode, wherein the anode and/or the cathode contains a porous nano-structure composed of graphene, graphene oxide, graphene fluoride, doped graphene, doped graphene oxide, carbon nano-fiber, carbon nano-tube, carbon black, activated carbon, disordered carbon, soft carbon, hard carbon, meso-phase carbon, nano carbon particle, and/or nano graphite particle.

Preferably, in all of the afore-disclosed electrochemical cells, the cathode does not contain a full capacity of lithium initially when the battery is assembled. The prelithiated current collector near the anode or the cathode can provide the needed amount of lithium. In fact, the cathode does not need to contain any lithium initially when the battery is assembled. This will further increase the battery capacity by up to 10-20% if the cell is a lithium-ion cell. These and other advantages and features of the present invention will become more transparent with the description of the following best mode practice and illustrative examples.

The present invention also provides a process for producing a prelithiated current collector. In a preferred embodiment, the process comprises:
(a) continuously providing a sheet of electrically conductive substrate from a feeder roller into a lithium-depositing zone, said substrate having two opposed primary surfaces;
(b) depositing a desired amount of lithium or lithium alloy onto at least one of the two primary surfaces;
(c) depositing a desired amount of carbon (and/or other stabilizing agent, such as Si Ge, B, Al, Sn) onto said at least one of the two primary surfaces while performing step (b) concurrently, alternately, or sequentially to produce a substrate coated with a lithium/carbon mixture layer; and
(d) collecting said lithium/carbon-coated substrate or prelithiated current collector on a collector roller.

The step of depositing lithium or lithium alloy may include a deposition procedure selected from physical vapor deposition, sputtering, chemical vapor deposition, ion beam deposition, electron beam deposition, laser-assisted ablation deposition, or a combination thereof. The step of depositing carbon (and/or other stabilizing agent) may include a deposition procedure selected from physical vapor deposition, sputtering, chemical vapor deposition, ion beam deposition, electron beam deposition, laser-assisted ablation deposition, or a combination thereof.

Figure 1:
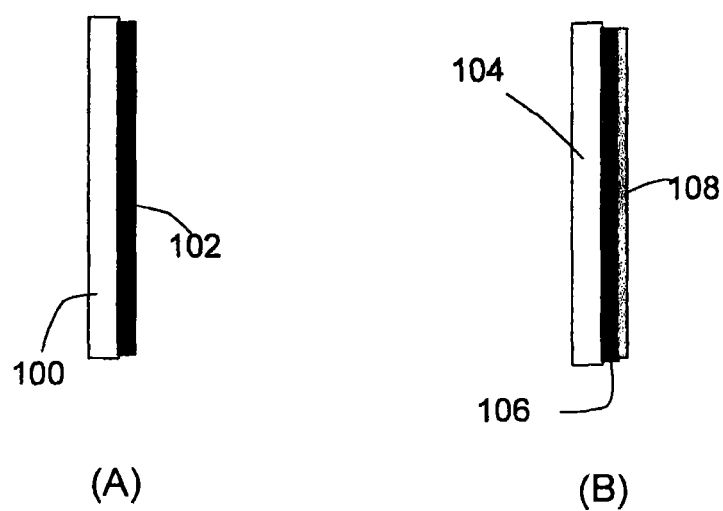
FIG. 1 (A) Schematic of a prelithiated current collector composed of an electrically conductive substrate 100 (e.g. copper foil or graphene sheet aggregate film) and a layer of mixture of carbon 102 (preferably amorphous carbon) and lithium (or lithium alloy); and (B) Another prelithiated current collector composed of a conductive substrate 104 coated with a layer of carbon-lithium mixture 106, which is further coated with a thin carbon protective layer 108. This thin carbon layer is not necessary if the mixture layer contains a lithium content less than 80% by weight. Carbon is but one example of a wide variety of stabilizing agents that can be used to mix with lithium, making the resulting mixture layer air stable.

158; (D) A lithium-ion capacitor (hybrid supercapacitor) composed of a non-lithiated current collector 160 at the anode, a graphite anode 162 (and a sheet of lithium foil 164 as part of the anode), a porous separator 166 soaked with liquid electrolyte, a cathode 168 containing a cathode active material (e.g. activated carbon having a high specific surface area), and a non-lithiated current collector 170; and (E) A prior art lithium-graphene cell composed of a non-lithiated current collector 174 at the anode, a porous, nano-structured anode 176 (e.g. comprising graphene sheets having high surface areas upon which returning lithium ions can deposit during cell recharge, which are mixed with surface-stabilized lithium powder particles, or having a sheet of lithium foil attached to the nano-structure), a porous separator 178 soaked with liquid electrolyte, a cathode 180 containing a graphene-based cathode active material (e.g. graphene, graphene oxide, or graphene fluoride sheets having high specific surface areas to capture lithium ions during cell discharge), and a non-lithiated current collector 182.

Figure 3:
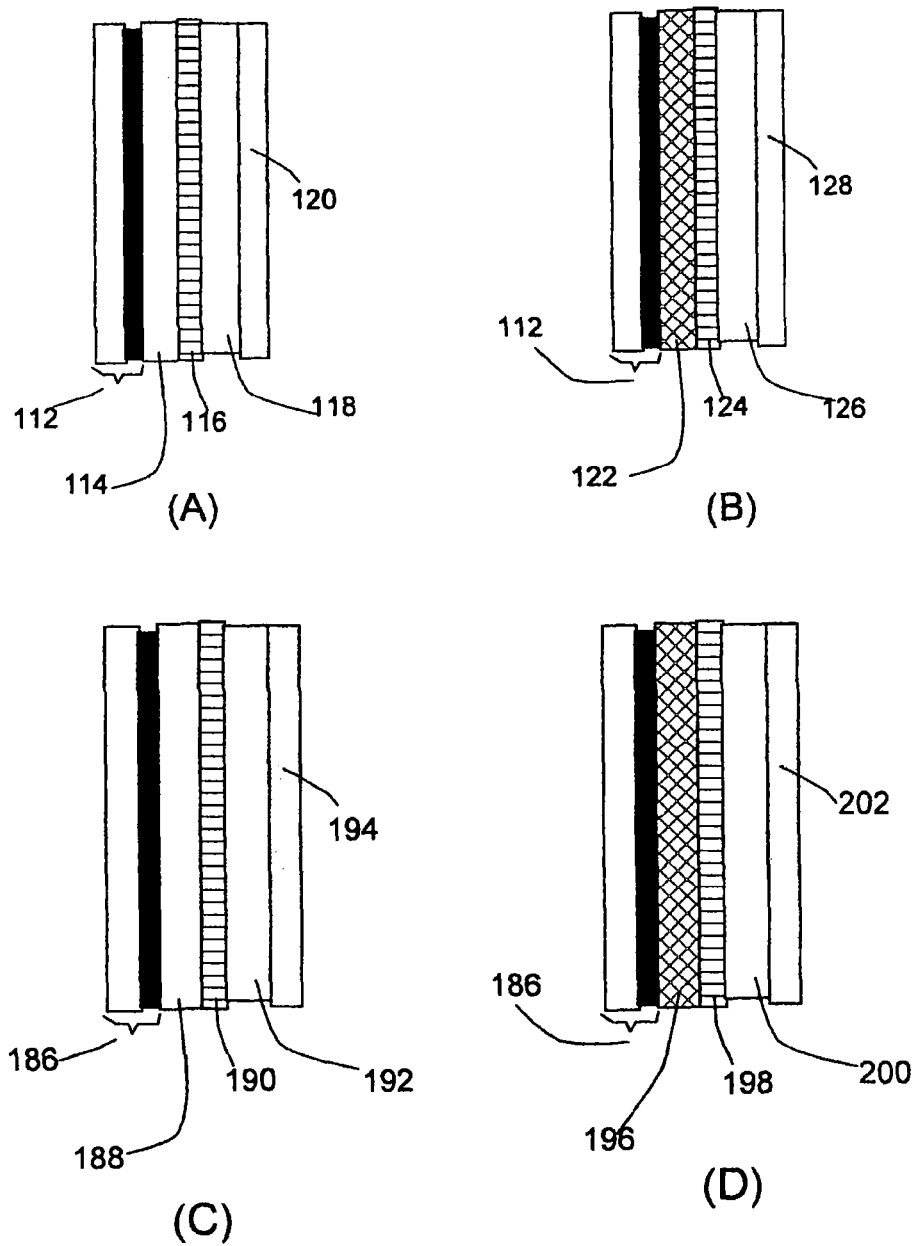

FIG. 3 (A) Schematic of a new lithium-ion cell composed of a pre-lithiated current collector 112 at the anode, an anode 114 containing an anode active material (e.g. non-lithiated graphite or Si particles), a porous separator 116 soaked with liquid or gel electrolyte, a cathode 118 containing a cathode active material (e.g. non-lithiated $V_2O_5$ and $MnO_2$ or lithiated species, such as lithium iron phosphate or lithium cobalt oxide particles), and a non-lithiated current collector 120; (B) A new lithium-metal cell composed of a pre-lithiated current collector 112 at the anode, an anode layer 122 (e.g. nano-structured graphene or carbon nanotube layer, providing high surface areas upon which lithium ions readily deposit during cell re-charge), a porous separator/electrolyte layer 124, a cathode 126 containing a cathode active material (e.g. lithium-free $V_2O_5$, $MoS_2$, and $MnO_2$), and a non-lithiated current collector 128; (C) A new lithium-ion capacitor (hybrid supercapacitor) composed of a pre-lithiated current collector 186 at the anode, a non-lithiated graphite anode 188 (for lithium ion intercalation during re-charge), a porous separator 190 soaked with liquid electrolyte, a cathode 192 containing a cathode active material (e.g. activated carbon having a high specific surface area), and a non-lithiated current collector 194; and (D) A new lithium-graphene cell composed of a pre-lithiated current collector 186 at the anode, a porous, nano-structured anode 196 (e.g. comprising graphene sheets having high surface areas upon which returning lithium ions can deposit during cell recharge), a porous separator 198 soaked with liquid electrolyte, a cathode 200 containing a graphene-based cathode active material (e.g. graphene, graphene oxide, or graphene fluoride sheets having high specific surface areas to capture lithium ions during cell discharge), and a non-lithiated current collector 202.

Figure 4A:
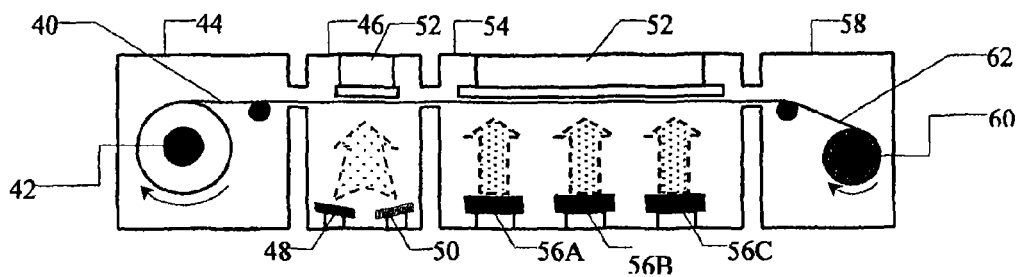
Figure 4B:
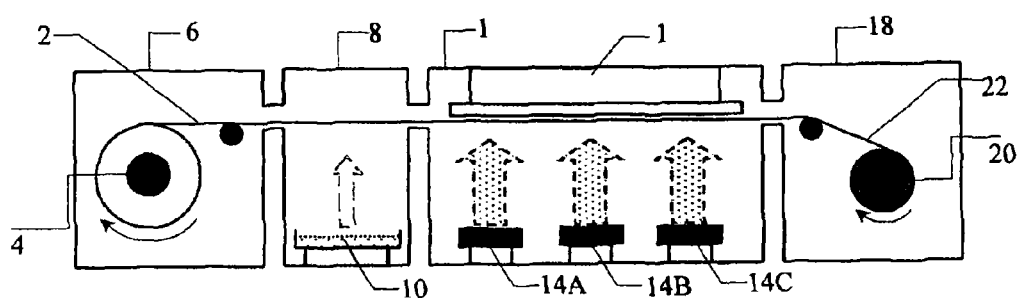

FIG. 4 (a) Schematic of a process and related production equipment that can be used to produce prelithiated current collectors cost-effectively on a roll-to-roll basis; (b) Another effective and scalable process and related production equipment that can be used to produce prelithiated current collectors on a roll-to-roll basis.

Figure 5:
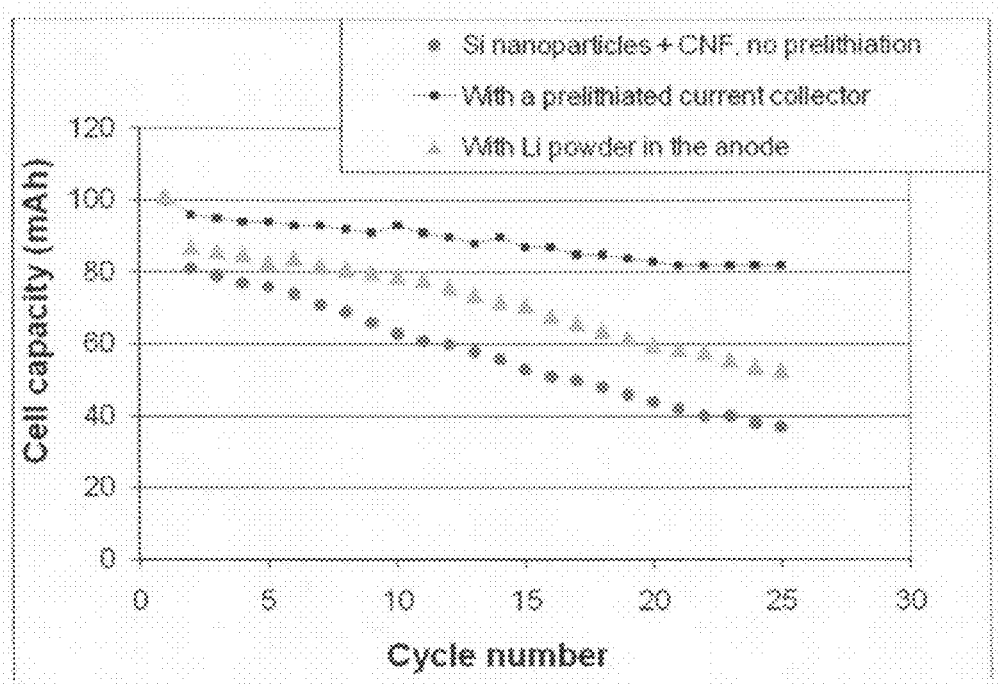

FIG. 5 Discharge capacities of three lithium-ion battery cells (coin-size full cells) each with a Si nanoparticle anode (Si+CNFs as a conductive filler) and a lithium cobalt oxide cathode: one cell containing a non-prelithiated copper foil anode current collector (control), another containing a non-prelithiated copper foil anode current collector (but the anode including some lithium powder particles mixed with Si and CNFs), and the third cell containing a pre-lithiated copper foil as an anode current collector (no lithium powder).

Figure 6:
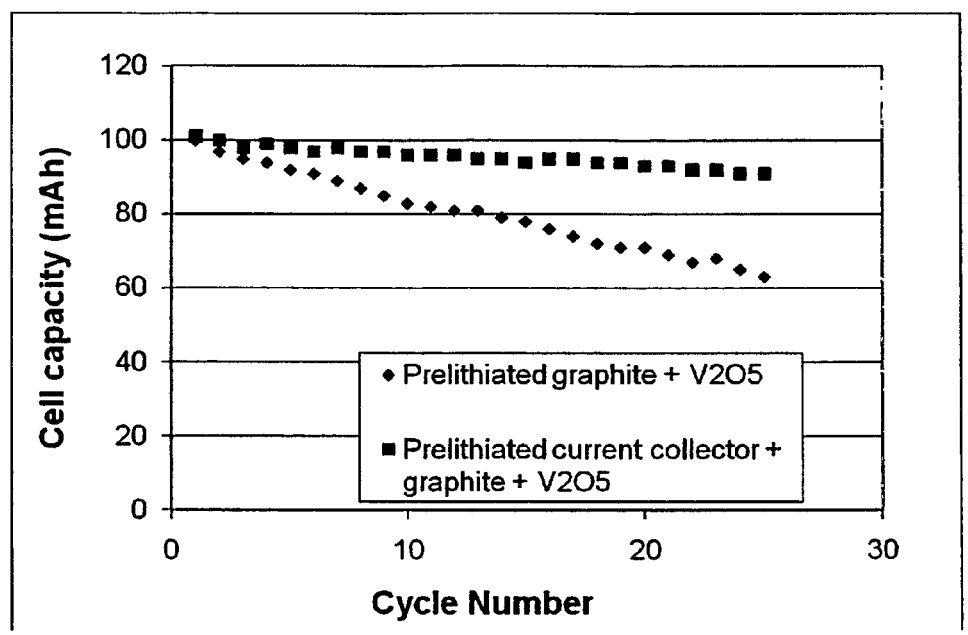

FIG. 6 Discharge capacities of two lithium-ion cells (coin-size full cells) each with a non-lithiated $V_2O_5$ cathode: one cell containing a prelithiated graphite anode and non-lithiated current collector at the anode side, and the other cell containing a non-lithiated graphite anode and a pre-lithiated anode current collector.

Figure 7:
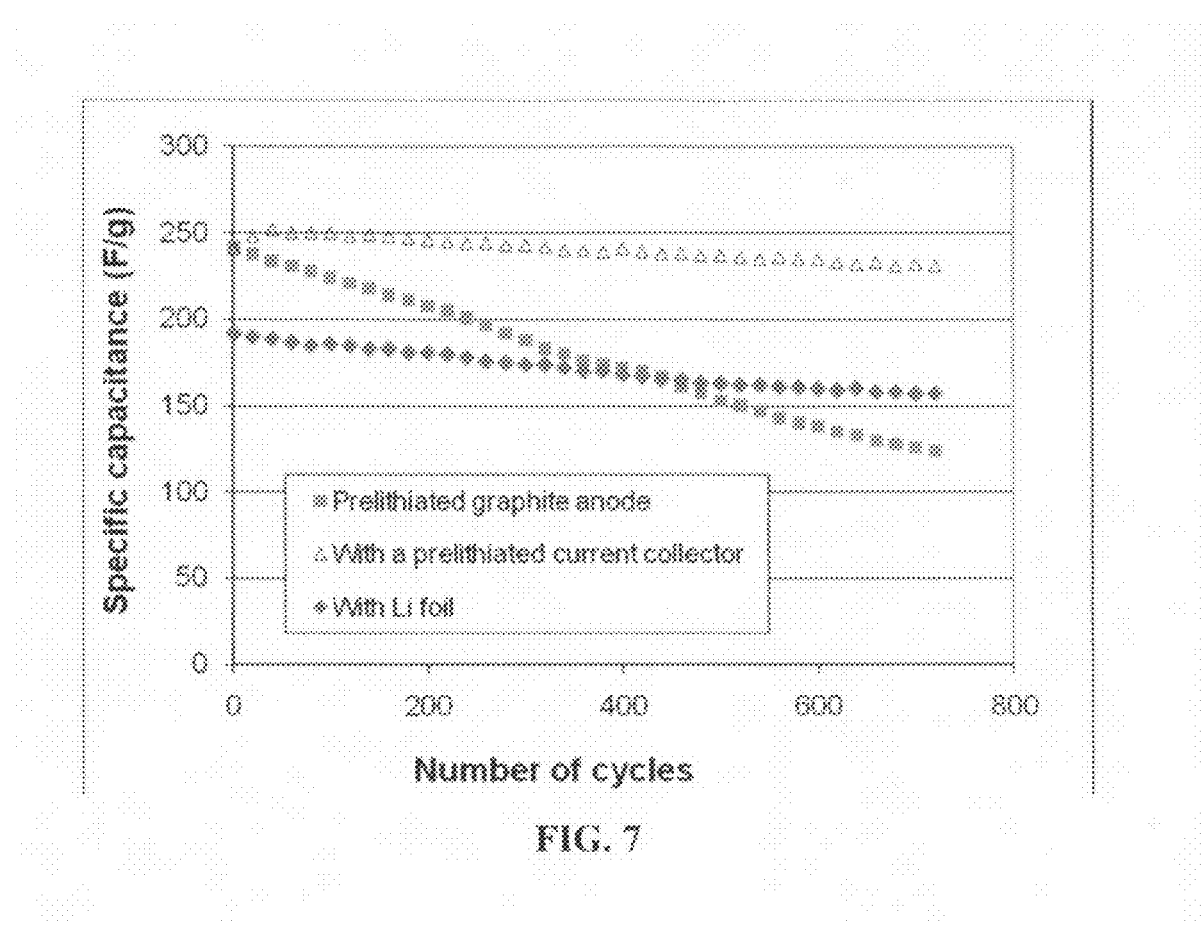

FIG. 7 Discharge capacities of three lithium-ion capacitor cells (coin-size full-cell supercapacitors): one cell containing a non-prelithiated copper foil anode current collector (control) and a pre-lithiated graphite anode, the second cell containing a non-prelithiated copper foil anode current collector (but the anode including some lithium foil as a lithium source), and the third cell containing a pre-lithiated copper foil of the present invention as an anode current collector and a non-lithiated graphite anode (no lithium powder and no lithium foil).

DETAILED DESCRIPTION OF PREFERRED EMBODIMENTS

The present invention provides a prelithiated current collector for a lithium-based electrochemical cell (e.g. battery or supercapacitor). In one preferred embodiment, as schematically shown in FIG. 1(A), the prelithiated current collector comprises: (a) an electrically conductive substrate having two opposed primary surfaces, and (b) a mixture layer of carbon (or other stabilizing agent, such as a transition metal or an element or elements in Groups (Columns) 5, 6, 7, and 8 of the Periodic Table of Elements: B, Al, Ga, In, Si, Ge, Sn, Pb, As, Sb, Bi, and Te) and lithium or lithium alloy coated on at least one of the primary surfaces, wherein lithium element is present in an amount of 1% to 99% by weight of the mixture layer. Typically, a free-standing lithium foil or a lithium film coated on a solid substrate is not air stable, being extremely sensitive to oxygen, nitrogen, and moisture in the air. Much to our surprise, when lithium or lithium alloy is co-deposited with an element selected from Groups 5, 6, 7, and 8 of the periodic table (such as B, Al, Ga, In, C, Si, Ge, Sn, Pb, As, Sb, Bi, and Te), a transition metal, or a combination thereof, the resulting co-deposited coating adhered to a conductive substrate become highly air stable. Such a feature makes it very convenient to mass-produce lithium-based battery and supercapacitor cells. The air stability is particularly great when lithium atoms and the atoms of the aforementioned stabilizing agent are well mixed or well dispersed.

This prelithiated current collector serves as an effective and safe lithium source for a wide variety of electrochemical energy storage cells, including the rechargeable lithium battery (e.g., lithium-metal, lithium-ion, lithium-sulfur, lithium-air, lithium-graphene, lithium-carbon, and lithium-carbon nanotube) and the supercapacitor (symmetric ultracapacitor, asymmetric ultracapacitor, hybrid supercapacitor-battery, or lithium-ion capacitor cell).

The prelithiated current collector may further comprise a carbon layer deposited on the mixture layer, as schematically shown in FIG. 1(B). This discrete carbon layer will further protect the underlying mixture layer and is particularly useful when the mixture layer has a high lithium content (e.g. >80% by weight of Li based on the total weight of the mixture layer).

Preferably, a mixture layer of lithium (or lithium alloy) and carbon (or other stabilizing agent) is coated on both primary surfaces and, further preferably, an additional discrete carbon layer is deposited on the mixture layer coated on at least one of the two primary surfaces. The mixture layer preferably has a thickness in the range of 0.1 nm and 25 µm, more preferably less than 1 µm, and can be less than 100 nm or even less than 10 nm.

The conductive substrate may be selected from foil or a thin sheet of any conductive material (such as any metal), but is preferably selected from a graphite layer, flexible graphite foil, foil of graphene sheets, foil of graphene oxide sheets, copper foil, nickel foil, stainless steel foil, nickel-coated stainless steel foil, copper-coated steel foil, titanium foil, chrome plated steel sheet, aluminum foil, carbon-coated aluminum foil, metal-coated polymer film, intrinsically conductive polymer film, conductive filler-polymer composite film, a porous nano-structured layer composed of graphene, graphene oxide, graphene fluoride, doped graphene, doped graphene oxide, carbon nano-fiber, carbon nano-tube, carbon black, activated carbon, disordered carbon, soft carbon, hard carbon, meso-phase carbon, nano carbon particle, and/or nano graphite particle, or a combination thereof. The thin foil or sheet is not required to have a smooth surface. Some surface porosity may be desirable in terms of providing a better adhesion between this conductive substrate and the mixture layer.

The mixture layer of carbon (or other stabilizing agent) and lithium (or lithium alloy) can further comprise an element selected from alkali metal, alkaline earth metal, transition metal, boron (B), aluminum (Al), gallium (Ga), indium (In), tin (Sn), silicon (Si), germanium (Ge), lead (Pb), selenium (Se), antimony (Sb), or bismuth (Bi) if it does not already have these elements.

The present invention also provides a process for producing a prelithiated current collector. In a preferred embodiment, as schematically shown in FIG. 4(A), the process comprises:
  (a) continuously providing a sheet of electrically conductive substrate 40 (having two opposed primary surfaces) from a feeder roller 42 (in a front winding chamber 44) into a lithium-depositing zone 46;
  (b) depositing a desired amount of lithium or lithium alloy onto at least one of the two primary surfaces;
  (c) depositing a desired amount of carbon (and/or other stabilizing agent, such as Si, Ge, B, Al, Sn) onto said at least one of the two primary surfaces while performing step (b) concurrently, alternately, or sequentially to produce a substrate coated with a lithium/carbon mixture layer (e.g., using sputtering as an example, lithium deposition may be conducted inside the deposition zone 46 (also referred to as a co-deposition chamber) having therein a substrate platform 52, a lithium target 50, and a stabilizing element target 48 (e.g. carbon or silicon target). The two targets 48, 50, under the influence of a heat source and/or magnetic field, can generate streams of lithium atoms and carbon or silicon atoms that are directed to impact onto a surface of the conductive substrate 40 (with the two targets being activated concurrently, alternately, or sequentially) and co-deposited thereon to form a mixture layer of a desired thickness); and
  (d) collecting said lithium/carbon-coated substrate 62 or prelithiated current collector on a collector roller 60.

The step (c) above may be optionally followed by a step of conveying the Li-stabilizing agent mixture-coated substrate into another deposition zone 54, containing a substrate platform 52 and one or multiple targets (56A, 56B, 56C, etc) to deposit an optional protective layer (e.g. carbon), prior to further conveying the coated substrate 62 into a rear winding chamber 58, wherein the product is collected on a winding (collector) roller 60.

Although sputtering was used as an example, the step of depositing lithium or lithium alloy may include a deposition procedure selected from sputterin, physical vapor deposition (PVD), chemical vapor deposition (CVD), ion beam deposition (e.g., ion implantation), electron beam deposition, laser-assisted ablation deposition, or a combination thereof. For instance, for metals with a low melting point and/or a low boiling point (e.g. Li and Sn), one can choose to use physical vapor deposition.

Figure 2:
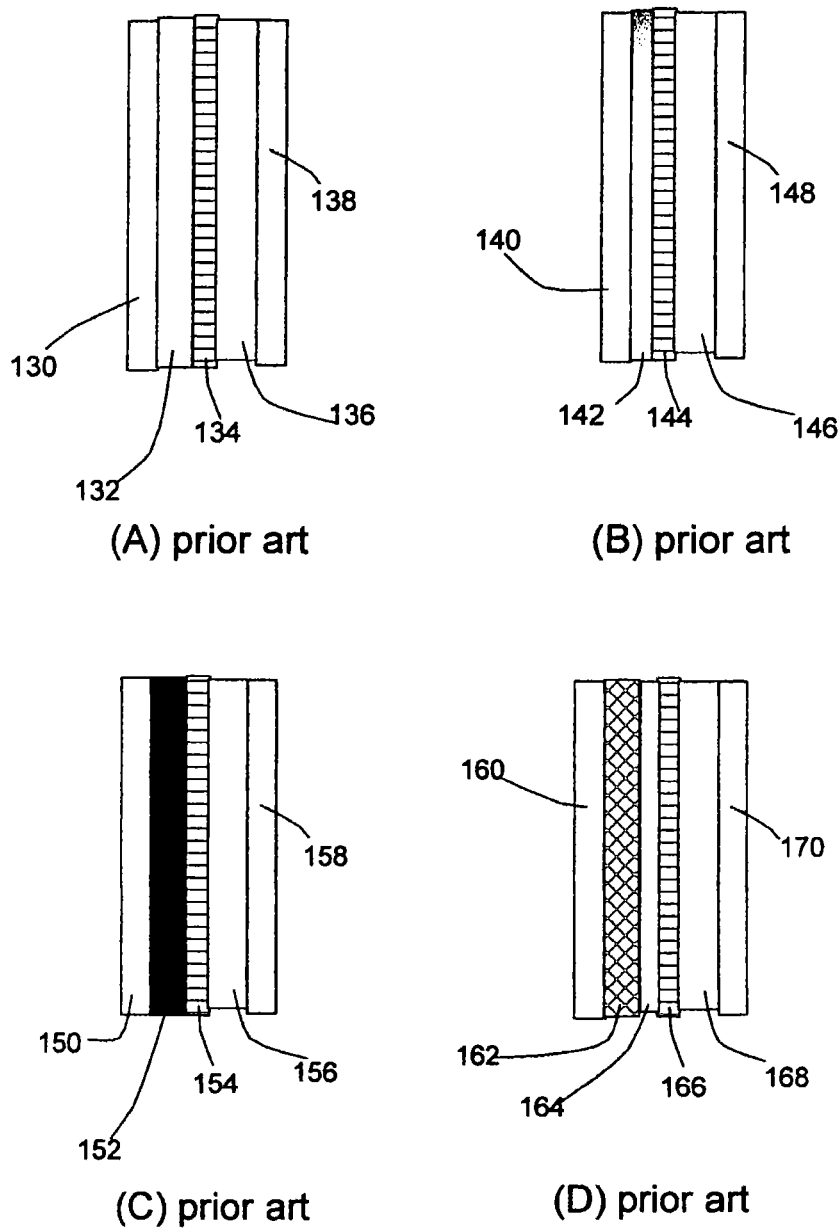
FIG. 2 (A) Schematic of a prior art lithium-ion cell composed of a non-lithiated current collector 130 at the anode, an anode 132 containing an anode active material (e.g. graphite particles), a porous separator 134 soaked with electrolyte, a cathode 136 containing a cathode active material (e.g. lithium iron phosphate or lithium cobalt oxide particles), and a non-lithiated current collector 138; (B) A prior art lithium-metal cell composed of a non-lithiated current collector 140 at the anode, a lithium film 142 or foil as the anode, a porous separator/electrolyte layer 144, a cathode 146 containing a cathode active material (e.g. lithium-free $V_2O_5$ and $MnO_2$), and a non-lithiated current collector 148; (C) A prior art lithium-ion capacitor (hybrid supercapacitor) composed of a non-lithiated current collector 150 at the anode, a prelithiated graphite 152 or lithium titanate anode, a porous separator 154 soaked with liquid electrolyte, a cathode 156 containing a cathode active material (e.g. activated carbon having a high specific surface area), and a non-lithiated current collector
Figure 2:
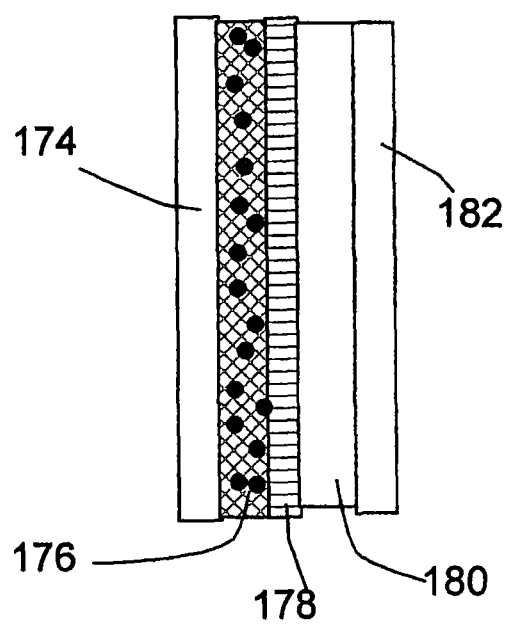

Using PVD as a deposition procedure, as shown in FIG. 2(B), the process comprises:
  (a) continuously providing a sheet of electrically conductive substrate 2 (having two opposed primary surfaces) from a feeder roller 4 (in a front winding chamber 6) into a lithium/stabilizer-depositing zone 8;
  (b) depositing a desired amount of lithium (or lithium alloy) onto at least one of the two primary surfaces;
  (c) depositing a desired amount of carbon (and/or other stabilizing agent, such as Ge, Al, Sn) onto said at least one of the two primary surfaces while performing step (b) concurrently, alternately, or sequentially to produce a substrate coated with a lithium/carbon mixture layer (e.g., using sputtering as an example, lithium deposition may be conducted inside the deposition zone 8 (also referred to as a co-deposition chamber) having therein one or multiple element vaporization unit 10 (e.g. where Li and Ge vapors are thermally generated). Streams of lithium atom and Ge atom vapors are directed to impact onto a surface of the conductive substrate 2 (with the two sources being activated concurrently, alternately, or sequentially) and co-deposited thereon to form a mixture layer of a desired thickness); and
  (d) collecting said lithium/carbon-coated substrate 22 or prelithiated current collector on a collector roller 20.

The step (c) above may be optionally followed by a step of conveying the Li-stabilizing agent mixture-coated substrate into another deposition zone 12, containing a substrate platform 16 and one or multiple targets (14A, 14B, 14C, etc) to deposit an optional protective layer (e.g. carbon), prior to further conveying the coated substrate 22 into a rear winding chamber 18, wherein the product is collected on a winding (collector) roller 20.

The step of depositing carbon (and/or other stabilizing agent) may include a deposition procedure selected from physical vapor deposition, sputtering, chemical vapor deposition, ion beam deposition, electron beam deposition, laser-assisted ablation deposition, or a combination thereof.

The mixture layer and/or the protective carbon layer may be a continuous-length layer. Alternatively, the mixture layer does not fully cover one primary surface, leaving an amount of exposed substrate surface free from the mixture of lithium or lithium alloy and carbon (or stabilizing agent). Such mixture material-free portion may be, as an example, in a pattern of multiple circular spots (mixture material free zones) dispersed in solid mixture material.

Schematically shown in FIG. 2(A) is a prior art lithium-ion cell composed of a non-lithiated current collector at the anode, an anode containing an anode active material (e.g. non-lithiated graphite particles), a porous separator soaked with electrolyte, a cathode containing a cathode active material (e.g. lithium iron phosphate or lithium cobalt oxide particles), and a non-lithiated current collector. In this cell, the needed lithium is stored in the cathode active material when the cell is produced. This is due to the notion that these cathode materials are structurally sound and relatively stable in open air (prelithiated graphite is not air stable). The notion that most of the current cathode active materials have a low specific capacity implies that this is not a good strategy. Such an approach also precludes the selection of many other useful high-capacity cathode active materials (e.g. $V_2O_5$). These problems are now overcome by the presently invented pre-lithiated current collector.

Another prior art lithium cell, schematically illustrated in FIG. 2(B), is a rechargeable lithium-metal cell composed of a non-lithiated current collector at the anode, a lithium film or foil as the anode, a porous separator/electrolyte layer, a cathode containing a cathode active material (e.g. lithium-free $V_2O_5$ and $MnO_2$), and a non-lithiated current collector. However, the lithium film or foil also is not air stable. Due to the normally thick lithium film and the difficulty in producing lithium film thinner than 100 μm, the battery designer has no choice but to use a thick Li film (meaning an unnecessarily excessive or significantly redundant amount of lithium has to be used at the anode), significantly reducing the capacity and energy per unit cell weight. These problems are now overcome by the presently invented prelithiated current collector.

Still another prior art lithium cell, schematically shown in FIG. 2(C), is a lithium-ion capacitor (or hybrid supercapacitor) composed of a non-lithiated current collector at the anode, a prelithiated graphite or lithium titanate anode, a porous separator soaked with liquid or gel electrolyte, a cathode containing an un-lithiated cathode active material (e.g. activated carbon having a high specific surface area), and a non-lithiated current collector. Again, the prelithiated graphite is not air stable. Further, only a limited amount of lithium can be incorporated into a prelithiated electrode, such as a prelithiated graphite or lithium titanate anode. As charge/discharge cycles continue, some amount of lithium is consumed during each cycle. These problems can be solved by using a prelithiated current collector with an adequate amount of lithium pre-added to compensate for subsequent lithium losses.

Shown in FIG. 2(D) is yet another prior art lithium cell (another lithium-ion capacitor or hybrid supercapacitor), which is composed of a non-lithiated current collector at the anode, a graphite anode (and a sheet of lithium foil as part of the anode), a porous separator soaked with liquid electrolyte, a cathode containing a cathode active material (e.g. activated carbon having a high specific surface area), and a non-lithiated current collector. Again, lithium foil is not air stable.

Still another prior art lithium cell, schematically shown in FIG. 2(E), is a lithium-graphene cell composed of a non-lithiated current collector at the anode, a porous, nano-structured anode (e.g. comprising graphene sheets having high surface areas upon which returning lithium ions can deposit during cell recharge, which are mixed with surface-stabilized lithium powder particles, or having a sheet of lithium foil attached to the nano-structure), a porous separator soaked with liquid electrolyte, a cathode containing a graphene-based cathode active material (e.g. graphene, graphene oxide, or graphene fluoride sheets having high specific surface areas to capture lithium ions during cell discharge), and a non-lithiated current collector. Surface-stabilized lithium powder is not easy to handle in the open air either. Further, the surface passivation layer (e.g. wax) is not a desirable ingredient to go into a battery since it can react with electrolyte, effectively reducing the amount of usable electrolyte.

All the problems cited in the above-described prior art cells can be solved if a cell is constructed to make use of the presently invented prelithiated current collector. For instance, such a prelithiated current collector can be used in the following cells:

FIG. 3(A) shows a schematic of a new lithium-ion cell of the present invention, which is composed of a pre-lithiated current collector at the anode, an anode containing an anode active material (e.g. non-lithiated graphite or Si particles), a porous separator soaked with liquid or gel electrolyte, a cathode containing a cathode active material (e.g. non-lithiated $V_2O_5$ and $MnO_2$ or lithiated species, such as lithium iron phosphate or lithium cobalt oxide particles), and a non-lithiated current collector.

The operation of such a lithium-ion cell may be described, for instance, using non-lithiated $V_2O_5$ as a cathode active material and graphite as an anode active material. During the first discharge, portion of lithium is ionized from the prelithiated anode current collector, supplying lithium ions ($Li^+$) into the electrolyte. The lithium ions travel through the porous separator into the cathode zone, entering the $V_2O_5$ lattice structure and combining therein with the electrons that move through an external circuit into the cathode to complete a redox reaction, forming $Li_xV_2O_5$. Upon first re-charge, most (but likely not all) of the lithium atoms are released from the cathode to form lithium ions, which travel through the porous separator and enter the anode zone, where lithium ions intercalate into the inter-graphene spaces of graphite crystallites. During the next discharge, lithium is released from both the anode current collector and the anode active material (graphite), and the lithium ions then enter the lattice structure of the cathode. The excess amount of lithium preloaded into the current collector can compensate for any anticipated lithium loss (e.g., due to the formation of SEI).

FIG. 3(B) shows another new lithium-metal cell of the present invention, which is composed of a pre-lithiated current collector at the anode, an anode layer (e.g. nano-structured graphene or carbon nanotube layer, providing high surface areas upon which lithium ions readily deposit during cell re-charge), a porous separator/electrolyte layer, a cathode containing a cathode active material (e.g. lithium-free $V_2O_5$, $MoS_2$, and $MnO_2$), and a non-lithiated current collector at the cathode. Alternatively, the cathode current collector may be pre-lithiated and the anode current collector is not.

The operation of such a lithium-metal cell may be described, for instance, using non-lithiated $V_2O_5$ as a cathode active material and a layer of nano-structured graphene sheets as part of the anode. During the first charge, portion of lithium is ionized from the prelithiated cathode current collector, supplying lithium ions ($Li^+$) into the electrolyte. The lithium ions travel through the porous separator into the anode zone, and depositing onto surfaces of graphene sheets. Upon first re-charge, most (but likely not all) of the lithium atoms are released from the cathode to form lithium ions, which travel through the porous separator and enter the $V_2O_5$ lattice structure, wherein lithium ions combine with the electrons that move through an external circuit into the cathode to complete a redox reaction, forming $Li_xV_2O_5$. During the next recharge, lithium is released from both the cathode and the cathode current collector to form lithium ions, which then enter the anode zone and deposit onto graphene surfaces. The excess amount of lithium preloaded into the current collector can compensate for any anticipated lithium loss (e.g., due to the formation of SEI).

FIG. 3 (C) shows yet another new lithium-ion capacitor (hybrid supercapacitor) of the present invention, which is composed of a pre-lithiated current collector at the anode, a non-lithiated graphite anode (for lithium ion intercalation during re-charge), a porous separator soaked with liquid electrolyte, a cathode containing a cathode active material (e.g. activated carbon having a high specific surface area), and a non-lithiated current collector. During the first discharge, lithium ions are released from the current collector and move to the cathode side where they participate in the formation of electric double layers of charges. During a subsequent recharge, lithium ions move back to the anode, intercalating into the interior of graphite particles.

FIG. 3 (D) shows a new lithium-graphene cell of the present invention, which is composed of a pre-lithiated current collector at the anode, a porous, nano-structured anode (e.g. comprising graphene sheets having high surface areas upon which returning lithium ions can deposit during cell recharge), a porous separator soaked with liquid electrolyte, a cathode containing a graphene-based cathode active material (e.g. graphene, graphene oxide, or graphene fluoride sheets having high specific surface areas to capture lithium ions during cell discharge), and a non-lithiated current collector. During the first discharge, lithium ions are released from the current collector and move to the cathode side where they are captured by the surfaces of graphene sheets. During a subsequent recharge, lithium ions move back to the anode, plating onto the surfaces of graphene sheets at the anode.

In summary, the present invention also provides a lithium-ion battery containing a prelithiated current collector of the present invention. Preferably, the lithium-ion battery contains an anode current collector (prelithiated) as defined above, an anode active material in contact with the anode current collector, a separator and electrolyte in ionic contact with the anode active material, a cathode in contact with the electrolyte, and a cathode current collector (prelithiated or non-lithiated) in contact with the cathode. It is of fundamental significance to note that the anode or cathode in the battery is separate from, and in addition to, the prelithiated current collector. The prelithiated current collector itself is not an electrode (anode or cathode).

In a preferred embodiment, the lithium-ion battery contains an anode current collector (prelithiated or non-lithiated), an anode active material in contact with the anode current collector, a separator and electrolyte in ionic contact with the anode active material, a cathode, and a prelithiated cathode current collector of the present invention.

Preferably, the anode active material in any of the presently invented lithium-ion batteries is selected from the group consisting of
(a) Carbon, meso-phase carbon, soft carbon, hard carbon, carbon black, activated carbon, natural graphite, artificial graphite, pyrolytic graphite, exfoliated graphite flakes, graphite worm, carbon nano-fiber, carbon nano-tube, graphene, graphene oxide, graphene fluoride, carbon fiber, graphite fiber, graphite whisker, and coke;
(b) Silicon (Si), germanium (Ge), tin (Sn), lead (Pb), antimony (Sb), bismuth (Bi), zinc (Zn), aluminum (Al), and cadmium (Cd);
(c) Alloys or intermetallic compounds of Si, Ge, Sn, Pb, Sb, Bi, Zn, Al, Ti, Fe, Mn, or Cd with other elements, wherein said alloys or compounds are stoichiometric or non-stoichiometric;
(d) Oxides, carbides, nitrides, sulfides, phosphides, selenides, and tellurides of Si, Ge, Sn, Pb, Sb, Bi, Zn, Al, Fe, Ti, Mn, Co, or Cd, and their mixtures or composites; and
(e) Combinations thereof.

The anode active material is preferably of nanocrystalline or amorphous structure in a thin film (coating) or fine particle form (including nano particle, nano-wire, nano-tube, nano-rod, nano-sheet, nano-belt, etc).

Alternatively, the lithium-ion cell may contain a prelithiated current collector at the anode and a non-lithiated or prelithiated current collector at the cathode plus other components described above (such as an anode, a separator, a cathode, and electrolyte).

With the presence of a prelithiated current collector, the lithium-ion battery may contain a cathode having a lithium-free cathode active material. The lithium-free cathode active material selected from sulfur, a chalcogen compound, $TiS_2$, $MoS_2$, $MnO_2$, $CoO_2$, $VO_2$, $V_2O_5$, $V_3O_8$, $V_4O_9$, $V_6O_{13}$, transition metal oxide, a non-lithiated intercalation compound, or a combination thereof.

The present invention also provides a lithium-metal battery containing a prelithiated current collector as defined above. This is preferably a rechargeable lithium-metal battery containing a prelithiated anode current collector, a porous anode, a separator and electrolyte in contact with the anode, a cathode in contact with the electrolyte, and a cathode current collector (prelithiated or non-lithiated) in contact with the cathode.

The present invention furthers provides a rechargeable lithium ion-enabling cell containing a prelithiated anode current collector, wherein the cell is selected from
(a) A lithium-sulfur cell, comprising a nano-structured porous anode, a separator and electrolyte, a sulfur cathode, and a cathode current collector;
(b) A lithium-air cell, comprising a nano-structured porous anode, a separator and electrolyte, and an air cathode;
(c) A lithium-graphene cell, comprising a nano-structured porous anode, a separator and electrolyte, a cathode comprising nano sheets of graphene, graphene oxide, graphene fluoride, doped graphene, and/or doped graphene oxide;
(d) lithium-carbon cell, comprising a nano-structured porous anode, a separator and electrolyte, a cathode comprising carbon nano-fiber, carbon nano-tube, carbon black, activated carbon, disordered carbon, soft carbon, hard carbon, meso-phase carbon, nano carbon particle, and/or nano graphite particle; or
(e) asymmetric ultracapacitor cell, hybrid supercapacitor-battery cell, or lithium-ion capacitor cell, comprising an anode, a separator and electrolyte, and a cathode, wherein the anode and/or the cathode contains a porous nano-structure composed of graphene, graphene oxide, graphene fluoride, doped graphene, doped graphene oxide, carbon nano-fiber, carbon nano-tube, carbon black, activated carbon, disordered carbon, soft carbon, hard carbon, meso-phase carbon, nano carbon particle, and/or nano graphite particle.

Preferably, in all of the afore-disclosed electrochemical cells, the cathode does not contain a full capacity of lithium initially when the battery is assembled. The prelithiated current collector near the anode or the cathode can provide the needed amount of lithium. In fact, the cathode does not need to contain any lithium initially when the battery is assembled. This will further increase the battery capacity by up to 10-20% if the cell is a lithium-ion cell. These and other advantages and features of the present invention will become more transparent with the description of the following best mode practice and illustrative examples.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

EXAMPLE 1

Prelithiated Copper Foil as a Current Collector in a Lithium-Ion Cell

Three lithium-ion battery cells (coin-size full cells) were fabricated and their electrochemical performance was studied. Each cell contains a Si nanoparticle anode (Si+carbon nano-fibers or CNFs as a conductive filler) and a lithium cobalt oxide cathode. The first cell (baseline or control cell) contains a non-prelithiated copper foil anode current collector. The second cell contains a non-prelithiated copper foil anode current collector (but the anode includes some lithium powder particles mixed with Si and CNFs). These surface-stabilized lithium powder particles serve as a source of lithium ions. The third cell contains a pre-lithiated copper foil of the present invention as an anode current collector (no lithium powder).

The charge/discharge behaviors of these three cells were investigated. The discharge capacities of these three cells were summarized in FIG. 5. These data demonstrate that the presently invented lithium-ion cell containing a prelithiated current collector exhibit a much more stable cycling behavior compared with the control cell (without any extra lithium ion source) and a cell containing lithium powder as a lithium ion source). The control cell suffers a >60% drop in capacity after 25 cycles. In contrast, the cell containing a prelithiated current collector experiences a capacity loss of <20% over the same number of charge/discharge cycles. The first-cycle efficiency of the presently invented cell is also far superior to that of the control cell. It is also of significance to surprisingly observe that the presently invented cell containing a prelithiated current collector performs much better than a cell containing stabilized lithium particles of identical lithium content as the prelithiated current collector. The much greater capacity decay exhibited by the cell with stabilized lithium particles might have been due to continued reactions between the surface coating layer of the particles and liquid electrolyte.

EXAMPLE 2

Prelithiated Graphene Paper as a Current Collector

A sheet of graphene paper was prepared from chemically reduced graphene oxide supplied by Angstron Materials, Inc. (Dayton Ohio). This sheet was deposited with a mixture layer composed of approximately 80% lithium (Li) and 20% silicon (Si). This coated graphene sheet was used as a current collector in a lithium-ion cell which also contains a non-lithiated graphite anode, a separator, a non-lithiated $V_2O_5$ cathode, and a non-lithiated aluminum foil current collector at the cathode. For comparison purposes, a control cell was prepared, which contains a prelithiated graphite anode and a non-lithiated current collector at the anode side, and a non-lithiated $V_2O_5$ cathode, and a non-lithiated aluminum foil current collector at the cathode side.

FIG. 6 shows the discharge capacity of these two lithium-ion cells (coin-size full cells) as a function of the number of charge/discharge cycles. Clearly, the presently invented cell performs significantly better than the control cell. This is quite unexpected considering the notion that pre-lithiation was conducted at the anode side of both cells prior to assembly. This might be due to the fact that there is only a limited amount of lithium that can be pre-lithiated into the internal structure of graphite and this amount cannot be adjusted beyond the theoretical limit of 372 mAh/g. In contrast, the amount of lithium on the prelithiated current collector can be adjusted responsive to the anticipated needs of a particular cell. In this case, an extra amount of lithium was implemented in the mixture layer coated onto a surface of the prelithiated current collector.

EXAMPLE 3

Lithium-Ion Capacitors (Hybrid Supercapacitors)

Three lithium-ion capacitor cells (coin-size full-cell supercapacitors) were prepared and tested: one cell containing a non-prelithiated copper foil anode current collector (control) and a pre-lithiated graphite anode, the second cell containing a non-prelithiated copper foil anode current collector (but the anode including some lithium foil as a lithium ion source), and the third cell containing a pre-lithiated copper foil of the present invention as an anode current collector and a non-lithiated graphite anode (no lithium powder and no lithium foil).

The discharge capacities, based on total electrode weights, of these three cells are shown and compared in FIG. 7. The cycling stability of the cell featuring a prelithiated current collector (with an un-lithiated graphite anode) is clearly far superior to that of the control cell featuring a prelithiated graphite anode (with the anode current collector non-prelithiated). The cell with lithium foil as a source of extra lithium ions also shows relatively good stability, but it has several problems. First, lithium foil is not air stable. Second, lithium foil cannot be produced into thin film and, hence, difficult to incorporate an adequate and accurate amount into a cell.

In summary, the present invention provides an innovative, versatile platform materials technology that enables the design and manufacture of superior lithium cells having high energy densities and stable cycling behaviors. This new technology has the following significant advantages:

(1) The prelithiated current collectors of the present invention are surprisingly air-stable and are conducive to the mass production of high-energy and/or high-power cells in a real large-scale manufacturing environment.
(2) A prelithiated current collector can be designed and made to be used at either the anode or the cathode side of a cell and can be used for a wide variety of lithium cells.
(3) As compared to a prelithiated anode active material (e.g. prelithiated graphite), the prelithiated current collector is more advantageous in that, (a) the prelithiated current collector is more air stable, safer, and easier to handle; and (b) the prelithiated anode has a relatively limited lithium content (e.g. cannot exceed 355 mAh/g capacity) and, if portion of the stored lithium (out of this 355 mAh/g) is charged to enter a cathode active material, any parasitic or irreversible reaction occurring in the electrolyte or the cathode would serve to reduce the amount of lithium ions coming back to the anode during the subsequent recharge. Thus, the anode capacity would be lower than the initial capacity. If these irreversible reactions continue during subsequent charge/discharge cycles, the cell capacity will continue to drop. By contrast, the amount of lithium that can be pre-stored in the presently invented prelithiated current collector does not suffer from this limitation. The desired amount of lithium for the design capacity plus the anticipated need to compensate for the continued loss can be precisely pre-loaded into the current collector. This very subtle yet very significant advantage has never been recognized in any prior work.
(4) The battery cell of the present invention does not contain a sacrificial electrode or an extra electrode in addition to an anode and a cathode in a cell.
(5) The battery cell of the present invention comprises an anode that does not contain an unstable lithium metal phase or lithium metal powder particles dispersed in the anode;
(6) The battery cell of the present invention provides a convenient source of lithium (not disposed in an electrode active material) to compensate for the formation of SEI layers during charging, in addition to providing enough lithium to intercalate into a cathode active material during discharging. The battery features a long and stable cycle life due to an adequate supply of lithium to compensate for potentially continued irreversible consumption of lithium.
(7) The use of a prelithiated current collector enables the use of non-prelithiated cathode materials that typically have a much higher specific capacity as compared to the conventional lithiated cathode active materials commonly used in lithium-ion and lithium-metal secondary battery cells. This advantage makes it possible to design and construct battery cells that have a significantly higher energy density.

The invention claimed is:

1. A lithium cell or electrochemical cell containing an anode current collector or cathode current collector, an anode active material layer, a cathode active material layer, a separator between said anode active material layer and said cathode active material layer, and electrolyte in ionic contact with said anode active material layer and cathode active material layer, wherein said anode current collector or cathode current collector is a prelithiated current collector, separate from said anode active material layer or cathode active material layer, comprising:
  (a) an electrically conductive substrate having two opposed primary surfaces, and
  (b) a mixture layer of lithium or lithium alloy co-deposited with a lithium-stabilizing agent;
  said mixture layer being coated on at least one of said primary surfaces, wherein lithium element in said mixture layer is present in an amount of 1% to 99% by weight of the mixture layer and said mixture layer is air stable, not reacting with oxygen or moisture in the air;
  wherein said anode active material layer or cathode active material layer is a separate, discrete, continuous layer apart from said mixture layer and wherein said lithium cell contains no unstable lithium metal phase, no lithium metal particles, and no prelithiated anode active material when the lithium cell is made.

2. The lithium cell of claim 1, wherein the lithium-stabilizing agent is selected from an element in the group consisting of B, Al, Ga, In, C, Si, Ge, Sn, Pb, As, Sb, Bi, Te, and combinations thereof.

3. The lithium cell of claim 1, wherein said lithium-stabilizing agent is carbon (C).

4. The lithium cell of claim 3, wherein said mixture layer of carbon and lithium or lithium alloy further comprises an element selected from alkali metal, alkaline earth metal, transition metal, boron (B), aluminum (Al), gallium (Ga), indium (In), tin (Sn), silicon (Si), germanium (Ge), lead (Pb), selenium (Se), antimony (Sb), or bismuth (Bi).

5. The lithium cell of claim 1, wherein said carbon in said mixture layer is amorphous carbon.

6. The lithium cell of claim 1, wherein said lithium-stabilizing agent is selected from B, Al, Ga, In, C, Si, Ge, Sn, Pb, As, Sb, Bi, Te, a transition metal, or a combination thereof; said mixture layer being coated on both primary surfaces.

7. The lithium cell of claim 1, wherein said prelithiated current collector further comprises a discrete carbon layer deposited on said mixture layer.

8. The lithium cell of claim 7, wherein said conductive substrate is selected from a graphite layer, flexible graphite foil, foil of graphene sheets, foil of graphene oxide sheets, copper foil, nickel foil, stainless steel foil, nickel-coated stainless steel foil, copper-coated steel foil, titanium foil, chrome plated steel sheet, aluminum foil, carbon-coated aluminum foil, metal-coated polymer film, intrinsically conductive polymer film, conductive filler-polymer composite film, a porous nano-structured layer composed of graphene, graphene oxide, graphene fluoride, doped graphene, doped graphene oxide, carbon nano-fiber, carbon nano-tube, carbon black, activated carbon, disordered carbon, soft carbon, hard carbon, meso-phase carbon, nano carbon particle, and/or nano graphite particle, or a combination thereof.

9. The lithium cell of claim 7, wherein said mixture layer of carbon and lithium or lithium alloy further comprises an element selected from alkali metal, alkaline earth metal, transition metal, boron (B), aluminum (Al), gallium (Ga), indium (In), tin (Sn), silicon (Si), germanium (Ge), lead (Pb), selenium (Se), antimony (Sb), or bismuth (Bi).

10. The lithium cell of claim 7, wherein said mixture layer or said carbon layer is a continuous-length layer.

11. The lithium cell of claim 7, wherein said mixture layer and said carbon layer do not fully cover said at least one primary surface, leaving an amount of exposed substrate surface free from the mixture of lithium or lithium alloy and a lithium-stabilizing agent.

12. The lithium cell of claim 7 wherein said prelithiated current collector is a cathode current collector.

13. The lithium-ion battery of claim 12, wherein said cathode contains a lithium-free cathode active material selected from sulfur, a chalcogen compound, $TiS_2$, $MoS_2$, $MnO_2$, $CoO_2$, $VO_2$, $V_2O_5$, $V_3O_8$, $V_4O_9$, $V_6O_{13}$, transition metal oxide, a non-lithiated intercalation compound, or a combination thereof.

14. A rechargeable lithium-metal battery containing an anode current collector of claim 7, a porous anode, a separator and electrolyte in contact with said anode, a cathode in contact with said electrolyte, and a cathode current collector in contact with said cathode.

15. A rechargeable lithium cell containing an anode current collector as defined in claim 7, wherein said cell is selected from
(a) A lithium-sulfur cell, comprising a nano-structured porous anode, a separator and electrolyte, a sulfur cathode, and a cathode current collector;
(b) A lithium-air cell, comprising a nano-structured porous anode, a separator and electrolyte, and an air cathode;
(c) A lithium-graphene cell, comprising a nano-structured porous anode, a separator and electrolyte, a cathode comprising nano sheets of graphene, graphene oxide, graphene fluoride, doped graphene, and/or doped graphene oxide;
(d) A lithium-carbon cell, comprising a nano-structured porous anode, a separator and electrolyte, a cathode comprising carbon nano-fiber, carbon nano-tube, carbon black, activated carbon, disordered carbon, soft carbon, hard carbon, meso-phase carbon, nano carbon particle, and/or nano graphite particle; or
(e) A symmetric ultracapacitor, asymmetric ultracapacitor cell, hybrid supercapacitor-battery cell, or lithium-ion capacitor cell, comprising an anode, a separator and electrolyte, and a cathode, wherein the anode and/or the cathode contains a porous nano-structure composed of graphene, graphene oxide, graphene fluoride, doped graphene, doped graphene oxide, carbon nano-fiber, carbon nano-tube, carbon black, activated carbon, disordered carbon, soft carbon, hard carbon, meso-phase carbon, nano carbon particle, and/or nano graphite particle.

16. The lithium cell of claim 1, wherein the mixture layer of lithium or lithium alloy and the lithium-stabilizing agent is coated on each of said two primary surfaces.

17. The lithium cell of claim 16, further comprising a carbon layer deposited on said mixture layer coated on at least one of the two primary surfaces.

18. The lithium cell of claim 1, wherein said mixture layer has a thickness in the range of from 0.1 nm to 25 µm.

19. The lithium cell of claim 1, wherein said mixture layer has a thickness less than 1 µm.

20. The lithium cell of claim 1, wherein said mixture layer has a pattern of solid material regions and perforations or mixture material-free regions.

21. The lithium cell of claim 1, wherein said conductive substrate is selected from a graphite layer, flexible graphite foil, foil of graphene sheets, foil of graphene oxide sheets, copper foil, nickel foil, stainless steel foil, nickel-coated stainless steel foil, copper-coated steel foil, titanium foil, chrome plated steel sheet, aluminum foil, carbon-coated aluminum foil, metal-coated polymer film, intrinsically conductive polymer film, conductive filler-polymer composite film, a porous nano-structured layer composed of graphene, graphene oxide, graphene fluoride, doped graphene, doped graphene oxide, carbon nano-fiber, carbon nano-tube, carbon black, activated carbon, disordered carbon, soft carbon, hard carbon, meso-phase carbon, nano carbon particle, and/or nano graphite particle, or a combination thereof.

22. The lithium cell of claim 1, wherein said mixture layer is a continuous-length layer.

23. The lithium cell of claim 1, wherein said mixture layer does not fully cover said at least one primary surface, leaving an amount of exposed substrate surface free from the mixture of lithium or lithium alloy and a lithium-stabilizing agent.

24. The lithium cell of claim 1, wherein said prelithiated current collector is a cathode current collector.

25. The lithium-ion battery of claim 24, wherein said cathode contains a lithium-free cathode active material selected from sulfur, a chalcogen compound, $TiS_2$, $MoS_2$, $MnO_2$, $CoO_2$, $VO_2$, $V_2O_5$, $V_3O_8$, $V_4O_9$, $V_6O_{13}$, transition metal oxide, a non-lithiated intercalation compound, or a combination thereof.

26. A lithium-metal battery containing a current collector of claim 1 as an anode current collector, an anode, a cathode, a separator between said anode and said cathode, and electrolyte in ionic contact with said anode and cathode.

27. A rechargeable lithium-metal battery containing an anode current collector of claim 1, a porous anode, a separator and electrolyte in contact with said anode, a cathode in contact with said electrolyte, and a cathode current collector in contact with said cathode.

28. A rechargeable lithium battery containing an anode current collector as defined in claim 1, wherein said cell is selected from:

(a) A lithium-sulfur cell, comprising a nano-structured porous anode, a separator and electrolyte, a sulfur cathode, and a cathode current collector;
(b) A lithium-air cell, comprising a nano-structured porous anode, a separator and electrolyte, and an air cathode;
(c) A lithium-graphene cell, comprising a nano-structured porous anode, a separator and electrolyte, a cathode comprising nano sheets of graphene, graphene oxide, graphene fluoride, doped graphene, and/or doped graphene oxide;
(d) A lithium-carbon cell, comprising a nano-structured porous anode, a separator and electrolyte, a cathode comprising carbon nano-fiber, carbon nano-tube, carbon black, activated carbon, disordered carbon, soft carbon, hard carbon, meso-phase carbon, nano carbon particle, and/or nano graphite particle; or
(e) A symmetric ultracapacitor, asymmetric ultracapacitor cell, hybrid supercapacitor-battery cell, or lithium-ion capacitor cell, comprising an anode, a separator and electrolyte, and a cathode, wherein the anode and/or the cathode contains a porous nano-structure composed of graphene, graphene oxide, graphene fluoride, doped graphene, doped graphene oxide, carbon nano-fiber, carbon nano-tube, carbon black, activated carbon, disordered carbon, soft carbon, hard carbon, meso-phase carbon, nano carbon particle, and/or nano graphite particle.

29. A process for producing the prelithiated current collector of claim 1, said process comprising:
(a) continuously providing a sheet of electrically conductive substrate from a feeder roller into a lithium-depositing zone, said substrate having two opposed primary surfaces;
(b) depositing a desired amount of lithium or lithium alloy onto at least one of the two primary surfaces;
(c) depositing a desired amount of a stabilizing agent onto said at least one of the two primary surfaces while performing step (B) concurrently, alternately, or sequentially to produce a substrate coated with a mixture layer of lithium or lithium alloy with a stabilizing agent; and
(d) collecting said coated substrate or prelithiated current collector on a collector roller.

30. The process of claim 29, wherein said step of depositing lithium or lithium alloy includes a deposition selected from physical vapor deposition, sputtering, chemical vapor deposition, ion beam deposition, electron beam deposition, laser-assisted ablation deposition, or a combination thereof.

31. The process of claim 29, wherein said step of depositing the stabilizing agent includes a deposition selected from physical vapor deposition, sputtering, chemical vapor deposition, ion beam deposition, electron beam deposition, laser-assisted ablation deposition, or a combination thereof.

32. A lithium-ion battery containing an anode current collector, an anode active material layer in contact with said anode current collector, a separator and electrolyte in ionic contact with said anode active material layer, a cathode layer in contact with said electrolyte, and a cathode current collector in contact with said cathode layer, wherein said anode current collector is a prelithiated current collector comprising:
(a) an electrically conductive substrate having two opposed primary surfaces, and
(b) a mixture layer of lithium or lithium alloy with a lithium-stabilizing agent; said mixture layer being coated on at least one of said primary surfaces, wherein lithium element in said mixture layer is present in an amount of 1% to 99% by weight of the mixture layer and said mixture layer is air stable, not reacting with oxygen or moisture in the air, wherein said lithium-stabilizing agent contains no anode active material;
wherein said lithium-ion battery contains no unstable lithium metal phase, no unstable lithium metal particles, and no prelithiated anode active material when the lithium-ion battery is made and wherein said anode active material layer or cathode layer is a separate, discrete, continuous layer apart from said mixture layer.

33. The lithium-ion battery of claim 32, wherein said anode current collector further comprises a discrete carbon layer deposited on said mixture layer.

34. The lithium-ion battery of claim 33, wherein said anode active material is selected from the group consisting of:
(a) Carbon, meso-phase carbon, soft carbon, hard carbon, carbon black, activated carbon, natural graphite, artificial graphite, pyrolytic graphite, exfoliated graphite flakes, graphite worm, carbon nano-fiber, carbon nano-tube, graphene, graphene oxide, graphene fluoride, carbon fiber, graphite fiber, graphite whisker, and coke;
(b) Silicon (Si), germanium (Ge), tin (Sn), lead (Pb), antimony (Sb), bismuth (Bi), zinc (Zn), aluminum (Al), and cadmium (Cd);
(c) Alloys or intermetallic compounds of Si, Ge, Sn, Pb, Sb, Bi, Zn, Al, Ti, Fe, Mn, or Cd with other elements, wherein said alloys or compounds are stoichiometric or non-stoichiometric;
(d) Oxides, carbides, nitrides, sulfides, phosphides, selenides, and tellurides of Si, Ge, Sn, Pb, Sb, Bi, Zn, Al, Fe, Ti, Mn, Co, or Cd, and their mixtures or composites; and
(e) Combinations thereof.

35. The lithium-ion battery of claim 33, wherein said cathode contains a lithium-free cathode active material selected from sulfur, a chalcogen compound, $TiS_2$, $MoS_2$, $MnO_2$, $CoO_2$, $VO_2$, $V_2O_5$, $V_3O_8$, $V_4O_9$, $V_6O_{13}$, transition metal oxide, a non-lithiated intercalation compound, or a combination thereof.

36. The lithium-ion battery of claim 32, wherein said anode active material is selected from the group consisting of:
(a) Carbon, meso-phase carbon, soft carbon, hard carbon, carbon black, activated carbon, natural graphite, artificial graphite, pyrolytic graphite, exfoliated graphite flakes, graphite worm, carbon nano-fiber, carbon nano-tube, graphene, graphene oxide, graphene fluoride, carbon fiber, graphite fiber, graphite whisker, and coke;
(b) Silicon (Si), germanium (Ge), tin (Sn), lead (Pb), antimony (Sb), bismuth (Bi), zinc (Zn), aluminum (Al), and cadmium (Cd);
(c) Alloys or intermetallic compounds of Si, Ge, Sn, Pb, Sb, Bi, Zn, Al, Ti, Fe, Mn, or Cd with other elements, wherein said alloys or compounds are stoichiometric or non-stoichiometric;
(d) Oxides, carbides, nitrides, sulfides, phosphides, selenides, and tellurides of Si, Ge, Sn, Pb, Sb, Bi, Zn, Al, Fe, Ti, Mn, Co, or Cd, and their mixtures or composites; and
(e) Combinations thereof.

37. The lithium-ion battery of claim 32, wherein said cathode contains a lithium-free cathode active material.

38. The lithium-ion battery of claim 32, wherein said cathode contains a lithium-free cathode active material selected from sulfur, a chalcogen compound, $TiS_2$, $MoS_2$, $MnO_2$, $CoO_2$, $VO_2$, $V_2O_5$, $V_3O_8$, $V_4O_9$, $V_6O_{13}$, transition metal oxide, a non-lithiated intercalation compound, or a combination thereof.

* * * * *